US012244986B2

(12) United States Patent
Bønnelykke et al.

(10) Patent No.: US 12,244,986 B2
(45) Date of Patent: Mar. 4, 2025

(54) WATERPROOF MICROPHONE ASSEMBLY WITH WIND NOISE FILTER

(71) Applicant: INVISIO A/S, Hvidovre (DK)

(72) Inventors: Jesper Rye Bønnelykke, Valby (DK); Dennis Normann Andersen, Ølstykke (DK); Morten Berg Arnoldus, Federiksberg C (DK)

(73) Assignee: INVISIO A/S, Hvidove (DK)

( * ) Notice: Subject to any disclaimer, the term of this patent is extended or adjusted under 35 U.S.C. 154(b) by 178 days.

(21) Appl. No.: 17/609,215

(22) PCT Filed: Apr. 30, 2020

(86) PCT No.: PCT/EP2020/062099

§ 371 (c)(1),
(2) Date: Nov. 5, 2021

(87) PCT Pub. No.: WO2020/225115

PCT Pub. Date: Nov. 12, 2020

(65) Prior Publication Data

US 2022/0217459 A1 Jul. 7, 2022

(30) Foreign Application Priority Data

May 9, 2019 (DK) ............................. PA201970297

(51) Int. Cl.
*H04R 1/08* (2006.01)
*H04R 1/10* (2006.01)

(52) U.S. Cl.
CPC ........... *H04R 1/086* (2013.01); *H04R 1/1075* (2013.01); *H04R 2410/07* (2013.01)

(58) Field of Classification Search
CPC ... H04R 1/086; H04R 1/1075; H04R 2410/07
(Continued)

(56) References Cited

U.S. PATENT DOCUMENTS 9,510,097 B1 * 11/2016 Tsai ........................ H04R 1/086
2013/0308796 A1 11/2013 Levinsohn
(Continued)

FOREIGN PATENT DOCUMENTS

CN 201887942 U * 6/2011
CN 107079207 A * 8/2017 ................ C08J 7/00
(Continued)

OTHER PUBLICATIONS

International Search Report and Written Opinion of International Searching Authority for Application No. PCT/EP2020/062099, mailed Jul. 13, 2020 (9 pages).
(Continued)

*Primary Examiner* — Paul Kim
(74) *Attorney, Agent, or Firm* — Ice Miller LLP

(57) ABSTRACT

A waterproof microphone assembly, which includes a waterproof acoustic transducer converting impinging sound energy into an electrical microphone signal. The assembly includes a wind noise filter suppresses ambient noise and has a first side and a second side. The wind noise filter includes a channel located between and connecting the first side and the second side. The assembly includes a housing having a cavity with a distal end and a proximal end. The distal end is acoustically connected with the acoustic transducer, and the proximal end is adjacent to and/or includes a part of the first side. The wind noise filter absorbs a liquid from at least the channel.

18 Claims, 5 Drawing Sheets

(58) Field of Classification Search
USPC .......................................................... 381/355
See application file for complete search history.

(56) References Cited

U.S. PATENT DOCUMENTS

| | | | | |
|---|---|---|---|---|
| 2014/0198932 | A1 | 7/2014 | Parkins | |
| 2016/0360318 | A1 | 12/2016 | Tsai | |
| 2017/0070799 | A1 | 3/2017 | Ikeda | |
| 2017/0164084 | A1* | 6/2017 | Vitt | H04R 1/08 |
| 2018/0070161 | A1 | 3/2018 | Horn | |
| 2019/0132690 | A1 | 5/2019 | Flaig | |

FOREIGN PATENT DOCUMENTS

| | | | | | |
|---|---|---|---|---|---|
| CN | 108024165 | B | * | 11/2019 | G03B 17/08 |
| DE | 102016116424 | A1 | | 3/2018 | |
| JP | 2001313990 | A | * | 11/2001 | |
| JP | 2013179437 | A | * | 9/2013 | H04R 1/02 |
| WO | WO-2015056443 | A1 | * | 4/2015 | B60R 11/0247 |

OTHER PUBLICATIONS

Danish Patent and Trademark Office, Examination Report for Patent Application No. PA 2019 70297, dated Nov. 12, 2019 (7 pages).

* cited by examiner

WATERPROOF MICROPHONE ASSEMBLY WITH WIND NOISE FILTER

CROSS-REFERENCE TO RELATED APPLICATIONS

This application is a U.S. National Stage of International Application No. PCT/EP2020/062099, filed Apr. 30, 2020, which claims the benefit of and priority to Denmark Patent Application No. PA201970297, filed May 9, 2019, both of which are incorporated herein by reference in their respective entireties.

FIELD OF THE INVENTION

The present disclosure generally relates to a waterproof microphone assembly generating a microphone signal in response to registered sound. More specifically, the present disclosure relates to a waterproof microphone assembly comprising a waterproof acoustic transducer, configured to convert impinging sound energy into an electrical microphone signal, and a wind noise filter configured to suppress ambient noise originating from exposure to wind.

BACKGROUND OF THE INVENTION

When a microphone is being used outdoors in a windy environment, the wind can cause air turbulence in the vicinity of the microphone. The air turbulence is e.g. produced by an air flow of the wind when the air flow meets various obstacles such as a housing of the microphone or of a device comprising the microphone. The housing could e.g. be a housing of a headset and/or hearing protection device or the like. Accordingly, the turbulence is a source of ambient noise for the microphone where the noise potentially degrades a sound signal being picked up at the microphone. The wind may be of such a level that the sound signal becomes unintelligible or at least becomes less intelligible.

A known way of reducing wind produced ambient noise as experienced by a microphone may involve providing a wind noise filter in the form of a covering or similar e.g. having an open cell foam material or similar located before (in the acoustic propagation path) the microphone. However, such constructions cannot readily be used to good effect (or potentially at all) when the microphone has been in contact with a liquid such as water. This may e.g. be the case when the microphone is part of a device, such as a waterproof headset and/or hearing protection device, configured to be used after being submersed in or exposed to water or another liquid. In such situations, water or another liquid may or often will be retained in the wind noise filter thereby occluding the wind noise filter for sound transmission in turn degrading the sound quality of an obtained microphone signal. Additionally, it is not unusual for audio purposes to have at least one cavity in front of the microphone, which then may also contain water further occluding the transmission path of sound to the microphone. For certain professional uses, such as professional uses in demanding environments and circumstances e.g. by armed or Special Forces, security personal, fire fighters or other emergency personal, etc., it may be important or even critical to establish at least a sufficient level of signal quality for the microphone signal after submersion or exposure to water as quickly as possible. In such professional uses, a microphone may e.g. be part of a headset (potentially also providing active and/or passive hearing protection) providing acoustic environmental awareness, speech and sound to other people, etc.

Accordingly, it would be an advantage to provide a waterproof microphone assembly comprising a wind noise filter that is at least less affected by submersion in or exposure to water or another liquid.

SUMMARY OF THE INVENTION

It is an object to provide a waterproof microphone assembly comprising a wind noise filter alleviating one or more of the above mentioned drawbacks at least to an extent, and in particular providing a waterproof microphone assembly that is at least less affected by submersion in or exposure to water or another liquid.

According to a first aspect, this is achieved, at least to an extent, by a waterproof microphone assembly comprising a waterproof acoustic transducer (also simply referred to herein as transducer) configured to convert impinging sound energy into an electrical microphone signal. The transducer may be of any suitable type e.g. a piezoelectric microphone, a MEMS microphone, a condenser or capacitor microphone, and others. The waterproof microphone assembly further comprises a wind noise filter configured to suppress or reduce wind-caused ambient noise. The wind noise filter generally allows for an overall propagation of sound through it (while suppressing or reducing wind-caused ambient noise). The wind noise filter may have a substantially conical, cylindrical, or any other suitable shape, including un-regular shapes. The wind noise filter has a first side (typically or e.g. internal to a device comprising the waterproof microphone assembly) and a second side (typically or e.g. external to a device comprising the waterproof microphone assembly) and further comprises a preferably through-going channel (or alternatively a partially or substantially through-going channel) located between and connecting the first side and the second side of the wind noise filter. In some embodiments, the first and the second sides of the wind noise filter (being connected by the through-going or partially through-going channel) is opposite each other, although they do not necessarily need to be (as an example the first and second sides may e.g. be connected or adjoining rather than being opposite). The waterproof microphone assembly further comprises a housing comprising a cavity having a distal end and a proximal end, where a distal direction is away from the wind noise filter and a proximal direction is an opposite direction towards the wind noise filter. The housing may or may not be waterproof. If the transducer is waterproof, it is not necessary (at least for certain designs) that the housing also is waterproof. The distal end of the cavity is acoustically connected with a sound receiving side of the transducer and the proximal end of the cavity is adjacent to and/or comprises a part of the first side of the wind noise filter (or at least the proximal end of the cavity is closer to the wind noise filter than the distal end of the cavity). Accordingly, the through-going (or the partially through-going) channel connects the cavity with an outside environment of the waterproof microphone assembly. In effect, the through-going (or the partially through-going) channel acts as a pressure-relief for the cavity as mentioned in the following (when the cavity is filled with water after submersion). In some embodiments, the cavity is directly adjacent to the transducer, enabling a more compact design, but in other embodiments, the cavity is remotely located from the transducer while they still are acoustically connected. Additionally, the wind noise filter is configured to absorb a liquid (at least when the wind noise filter is not completely full of the liquid) from at least the through-going (or the partially through-going) channel. This may e.g. be provided by the wind noise filter having a porous or otherwise open cell structure at least a part of, or alternatively the whole of, a boundary between the through-going (or the partially through-going) channel and the material of the wind noise filter. Alternatively, the wind noise filter is configured to absorb the liquid from at least the through-going (or the partially through-going) channel in other suitable ways, e.g. by comprising a foamy or spongy material being open toward at least a part of the through-going (or the partially through-going) channel. In some further embodiments, the wind noise filter is configured to additionally (or alternatively to absorbing the liquid from the through-going (or the partially through-going) channel) absorb the liquid (at least when the wind noise filter is not completely full of the liquid) directly from the cavity thereby draining the cavity at least potentially faster. The waterproof acoustic transducer may e.g. be waterproof by itself or alternatively it may be a traditional non-waterproof acoustic transducer shielded towards the cavity so that it in effect becomes waterproof. This may e.g. be done by having a waterproof membrane, barrier, or the like located in front of its sound receiving opening(s) (e.g. towards the cavity). Alternatively, a waterproof membrane, barrier, or the like may be located elsewhere, e.g. adjacent to the distal end of the cavity (and e.g. outside the cavity).

After submersion of the microphone assembly in water (or other exposure to water or any other liquid), i.e. when the microphone assembly is out of (or away from) the water again, water present in the through-going (or the partially through-going) channel, or at least a part thereof, will drain into the wind noise filter due to its water absorbing property. Additionally, at least a part, e.g. most or some, of water present in the cavity will drain out of the cavity and into the wind noise filter due to the pressure relief effect enabled by a pressure difference between respective sides (the first side adjacent to the cavity and the second side adjacent to the outside environment) of the through-going (or the partially through-going) channel. In effect, water (or another liquid) present in the cavity and/or the through-going (or the partially through-going) channel is removed (or the amount thereof is at least reduced) thereby—without user-intervention—establishing an open (or at least more open) sound propagation passage between the outside environment to the waterproof transducer so that clear or clearer sound can pass through the through-going (or the partially through-going) channel to the waterproof microphone. In the absence of a through-going (or the partially through-going) channel as disclosed herein, some water in the cavity might still drain out into an adjacent wind noise filter but the water will in this way still occlude or at least reduce or otherwise obstruct propagation of sound from the outside environment to the waterproof transducer due to no pressure-relief effect.

As mentioned, preferably, the channel of the wind noise filter is fully or completely through-going. However, in alternative embodiments the channel of the wind noise filter is only partially or substantially through-going. This may not, and typically will not, be just as optimal as a fully or completely through-going channel but for some uses it may still be sufficient, in particular if the material of the wind noise filter is porous, open-celled, or similar. The blocking part or material (in principle there may be more than one blocking part or section) of the partially or substantially through-going channel should preferably be small enough to not diminish the pressure-relief effect for the cavity and/or occlude sound transmission to the acoustic transducer too much. The blocking part(s) or material may be located at either end of the partially or substantially through-going channel and anywhere in-between (at one or more locations). In the following, whenever through-going channel is mentioned it is meant (at least in some embodiments) to include the alternative partially or substantially through-going channel as well unless otherwise stated.

Accordingly, a user may readily or more readily use a device, such as a headset and/or hearing protection device, comprising a waterproof microphone assembly as disclosed herein, even after submersing or exposing the device in or to water while automatically obtaining at least clearer sound. This may be crucial for establishing acoustic environmental awareness, intelligible reception and transmission of speech and sound from and to other people, etc. This is enabled without having the user to remove the device or cover parts of it up before submersing or exposing the device to water. Throughout the specification the term “water” will be used but it is to be understood that other relevant liquids are possible.

In some embodiments, the housing comprising the cavity also comprises the waterproof transducer. In at least some embodiments, the housing is sound attenuating and/or is configured to acoustically seal between the waterproof acoustic transducer and another part/other parts (e.g. a shell) of a device comprising the waterproof microphone assembly thereby improving hearing protection.

In some embodiments, the wind noise filter is made from a porous or otherwise open cell structure material. Alternatively, the wind noise filter is made from a foamy or spongy material.

In some embodiments, the wind noise filter is configured, e.g. by comprising a deformable material, to expel at least a part of a liquid absorbed by the wind noise filter in response to an applied mechanical pressure or force. This allows (especially if the wind noise filter has a shape and size enabling it to be squeezed or pressed by a user) a user of a device comprising the waterproof microphone assembly to apply a mechanical force or pressure, e.g. simply by squeezing or pressing on the wind noise filter, to expel water accumulated in the wind noise filter out of waterproof microphone assembly/the device comprising the waterproof microphone assembly typically to the outside (external) environment. Upon relaxation of the applied mechanical force or pressure, the wind noise-filter will return to its original state and may absorb some further water, if present, from the cavity. The process of applying mechanical force or pressure may be repeated a few or a number of times if needed, e.g. to drain out additional water still present in the cavity. It is noted, that clear or clearer sound already can pass to the microphone (due to pressure relief) but applying mechanical force or pressure may make the sound even more clear and will effectively drain the cavity of water in a simple and quick way.

In some embodiments, a draining channel is located adjoining and/or adjacent to the wind-noise filter (where the draining channel is open towards the wind-noise filter) and furthermore is located below or under the wind-noise filter and has a direction towards the ground whereby liquid in the wind-noise filter will drain into the draining channel in response to a gravitational pull. Droplets or similar will typically form at an end of the draining channel being furthest away from the wind-noise filter allowing water to drip away. This will passively drain the wind-noise filter and thereby drain the cavity faster (enables the wind-noise filter to absorb more liquid from the through-going channel and/or the cavity); in particular if the wind-noise filter is full or nearly full of liquid in which cases less or little liquid from the cavity and/or through-going channel is absorbed by the wind-filter. The draining channel may e.g. be located in a housing of a device comprising the waterproof microphone assembly.

In some embodiments, the opening or part of the draining channel being closest to the wind-noise filter is duct or funnel shaped.

In some embodiments, the draining channel has a general direction across, e.g. diagonally or downwards across, in relation to an up-down direction (i.e. a height direction of a user standing upright). In some alternative or additional embodiments, the draining channel is configured to utilize a capillary effect, e.g. by being relatively narrow, to more efficiently receive liquid from the wind-noise filter.

For a given (usable) direction, the longer the draining channel is, the better it drains water due to gravitational pull.

The draining channel may more or less be straight but may e.g. be curved or partly curved (i.e. comprises curved segments).

The cavity of the waterproof microphone assembly may vary in shape and size. In some embodiments, the cavity has a cross-sectional conical or trumpet shaped form wherein the distal end of the cavity has a smaller diameter than the proximal end of the cavity. Thus, the water accumulated in the cavity may be further facilitated to the wind-noise filter due to e.g. gravity forces. Additionally, more water will (again due to the gravity) settle away from the microphone (by the cavity tapering away from the microphone) more quickly establishing a clear(er) sound propagation path to the microphone. It is or it may be sufficient if only the surface of the cavity that is towards the ground upon which a user stands that tapers away from the microphone, although there are other advantages of a symmetric volume of the cavity e.g. as mentioned herein.

In some embodiments, the through-going channel is located aligned with a centre (in a plane substantially perpendicular to the distal and proximal directions) of the cavity and/or a centre (in a plane substantially perpendicular to the distal and proximal directions) of the acoustic transducer. In some embodiments, the through-going channel is located centrally (in a plane substantially perpendicular to the distal and proximal directions) in the first side and/or the second side of the wind noise filter. For generally cylindrical wind noise filters, this enables that during manufacturing and/or when a user e.g. replaces a wind noise filter there is no need to observe any orientation of the wind noise filter, or rather the location of the through-going channel. Alternatively, the through-going channel is offset in relation a central (in a plane substantially perpendicular to the distal and proximal directions) location. This may e.g. be towards the 'bottom' of the cavity facilitating quicker draining of the cavity. It is noted, that the through-going channel does not need to be straight.

In alternative embodiments, the waterproof microphone assembly may comprise a plurality of through-going channels located between the first side and the second side of the wind noise filter, instead of only one. In such embodiments, the through-going channels do not necessarily need to be of identical shape.

In some embodiments, the wind noise filter comprises an internal part entering into the cavity and comprises an external part extending outside the housing of the waterproof microphone assembly and/or outside a housing of a device comprising the waterproof microphone assembly.

In some embodiments, the wind noise filter may be secured to and/or in the housing of the waterproof microphone assembly and/or housing of a device comprising the waterproof microphone assembly by using a (waterproof) adhesive such as (waterproof) tape, glue, cement, paste, etc. Alternatively, the wind noise filter may be secured in other suitable ways.

It is to be understood that the waterproof microphone assembly according to various embodiments of the first aspect may be used in various different devices. For instance, the waterproof microphone assembly may be used in various types of headsets and/or hearing protection devices.

In at least some embodiments, the waterproof microphone assembly as disclosed herein (and accordingly its components and parts as relevant) are waterproof as rated by IP68 according to the well-known IEC standard 60529, also referred to as Ingress Protection Rating or Marking. The IP rating of how waterproof the waterproof speaker assembly is may vary according to specific intended use (and would be manufactured to meet a required level for a specific intended use).

According to another aspect, a headset and/or hearing protection device is provided where the headset and/or a hearing protection device comprises at least one waterproof microphone assembly according to the first aspect.

A headset and/or a hearing protection device may comprise a plurality of waterproof microphone assemblies and/or a plurality of wind noise filters each associated with a sound inlet.

The headset and/or a hearing protection device may e.g. be of any suitable type such as a circumaural, supra-aural, back-wear type, ear-loop type, earbud type headset and/or a hearing protection device, etc.

Further details and embodiments are disclosed in the following.

BRIEF DESCRIPTION OF THE DRAWINGS

These and other aspects will be apparent from and elucidated with reference to the illustrative embodiments as shown in the drawings, in which.

DETAILED DESCRIPTION

Various aspects and embodiments of a waterproof microphone assembly and a headset and/or a hearing protection device comprising waterproof microphone assembly as disclosed herein will now be described with reference to the figures.

Figure 1:
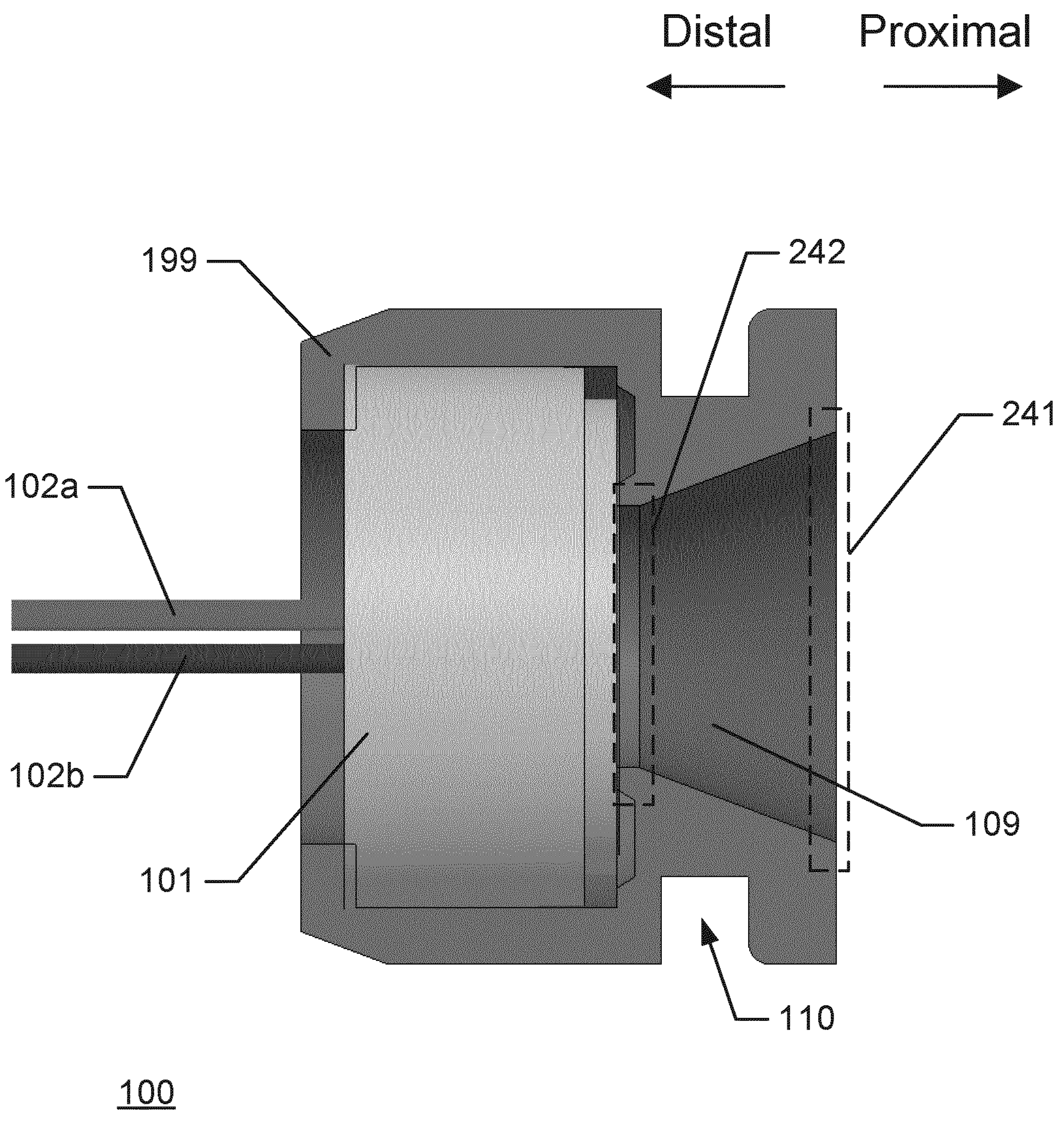
FIG. 1 schematically illustrates a cross-sectional view of a waterproof microphone assembly, illustrated without a wind noise filter, according to various embodiments as disclosed herein.

FIG. 1 schematically illustrates a cross-sectional view of a waterproof microphone assembly, illustrated without a wind noise filter, according to various embodiments as disclosed herein. Shown is a waterproof microphone assembly 100 wherein the waterproof microphone assembly 100 is shown, for simplicity, without a wind-noise filter. It is to be understood that the waterproof microphone assembly 100 when ready for use will comprise a wind-noise filter, e.g. as shown in FIGS. 2-5. It is to be understood that various embodiments, in particular as disclosed herein, may be envisioned depending on the microphone type and arrangement thereof. The shown waterproof microphone assembly 100 comprises a waterproof acoustic transducer 101 or similar (as generally known), a cavity 109, and a housing 199 as disclosed herein. The transducer 101 may be configured to convert sound (energy) impinging on the transducer 101 into an electrical microphone signal. A sound receiving side of the transducer 101 is located adjacent to a distal end 242 of the cavity and the transducer 101 may be located at least partly in the housing 199. In at least some embodiments and as shown, the housing 199 fully encloses the transducer 101. The transducer 101 may comprise a pair of electrical connections 102*a*, 102*b* being electrically connected to the transducer 101 and the microphone signal may be transmitted via the electrical connections 102*a*, 102*b* to one or more appropriate circuits and/or elements as generally known, e.g. for further processing.

The housing 199—apart from forming the cavity 109—may be for fitting with(in) a device comprising the waterproof microphone assembly 100. If the device is a headset and/or a hearing protection device, the housing 199 may e.g. be fitted in the shell of the headset and/or a hearing protection device. In at least some embodiments, the housing is sound attenuating and/or is configured to acoustically seal between the waterproof acoustic transducer 101 and another part/other parts (e.g. the shell) of the device comprising the waterproof microphone assembly 100 thereby improving hearing protection. The transducer 101, with its proximal end may be adjacent to the cavity 109 or alternatively at least be in acoustic connection with the cavity 109. The cavity 109 has a distal end 242 and a proximal end 241 and may be adjacent to the transducer 101 with the distal end 242. At least a part of the cavity 109 is enclosed in the housing 199. The cavity may be made in an e.g. conical form or a trumpet shaped form (as shown) or any other suitable form suitable for a specific production process and/or application. The cavity 109 is adjacent to and/or comprises a part of a wind-noise filter (not shown; see e.g. 221 in FIGS. 2-5) and is connected to an external environment as disclosed herein. The housing 199 may have different shapes according to specific embodiments and may optionally comprise at least one recess 110 or the like (as shown) for securing the waterproof microphone assembly 100 within a suitable device, e.g. a headset and/or a hearing protection device. In some embodiments, the housing 199 may further comprise at least a part of the wind-noise filter.

In different embodiments, the transducer 101 may be of a different type and/or layout than shown as generally known and may e.g. comprise multiple different components or parts. The transducer 101 may e.g. further comprise a microprocessor (not shown) having built in sound processing capabilities or be connected to such a microprocessor. Depending on the type of the waterproof microphone assembly 100 and/or the type of the transducer 101, varying constructional principles may be applied. As mentioned, the waterproof microphone assembly 100 may be an integral part of another device. As an example, the waterproof microphone assembly 100 may be part of a headset and/or a hearing protection device (not shown; see e.g. FIGS. 3, 4, and 5). The headset and/or a hearing protection device may comprise typical parts for a regular headset and/or a hearing protection device, such as headset and/or a hearing protection device housing, ear cup(s), and others.

Figure 2:
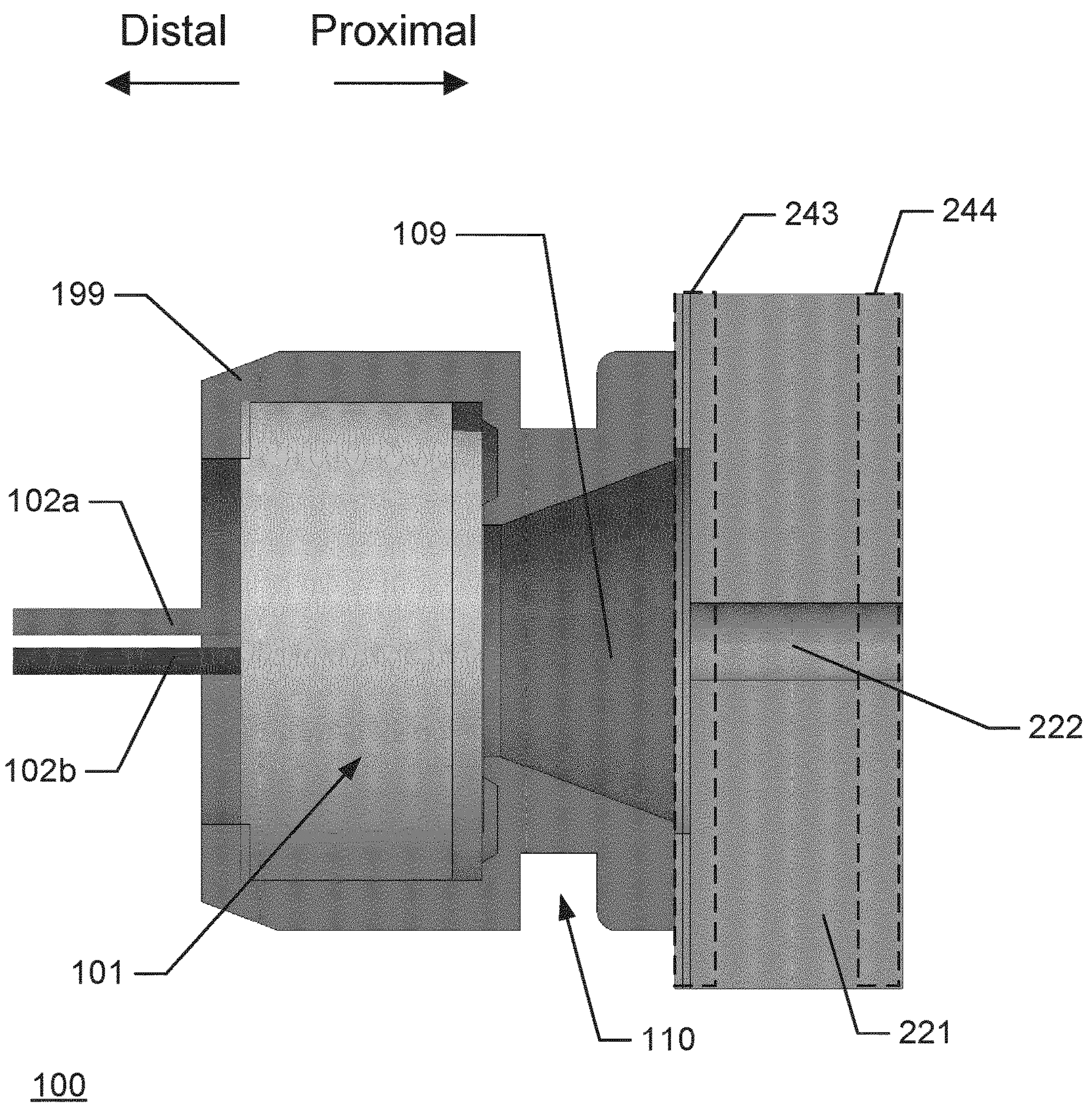
FIG. 2 schematically illustrates a cross-sectional view of a waterproof microphone assembly according to FIG. 1 illustrated with an exemplary wind noise filter.

FIG. 2 schematically illustrates a cross-sectional view of a waterproof microphone assembly according to FIG. 1 but now illustrated with an exemplary wind noise filter. The microphone assembly 100 of FIG. 2 corresponds to the one in FIG. 1 but is shown here to comprise a wind-noise filter 221 as disclosed herein where the wind noise filter 221 has a first (internal) side 243 and a second (external) side 244. The wind noise filter 221 is adjacent with the first side 243 to the proximal side of the cavity 209 and may be adjacent with the second side 244 to the external environment. The wind noise filter 221 comprises a through-going channel, conduit, passage, or the like 222 (throughout the application also simply referred to only as through-going channel). The through-going channel 222 is located between and connecting the first and the second sides 243/244 of the wind noise filter 221 where the through-going channel 222 is configured to absorb at least a part of the water being present in the through-going channel 222. The first (internal) side 243 of the wind noise filter 221 may in some embodiments be further configured for absorbing water accumulated in the cavity 109. The accumulated water in the cavity 109 won't damage the transducer 101 due to the waterproof characteristics of the transducer.

In some further embodiments, the wind noise filter 221 is configured to expel at least a part of a liquid absorbed by the wind noise filter 221 in response to an applied mechanical pressure or force. This may e.g. be achieved by the wind noise filter 221 being deformable. In this way, by squeezing or pressing the wind noise filter 221, a user may remove the water accumulated in the wind noise filter 221 and/or the cavity 109. By way of example, the wind noise filter 221 is shown as having a generally cylindrical (conical) shape, but other shapes may be utilized. In some alternative embodiments, the wind noise filter 221 may comprise a plurality of through-going channels 222 instead of only one.

In some embodiments, the housing 199 may fully comprise the wind noise filter 221, i.e. the wind noise filter 221 is fully enclosed or received inside the housing 199. In some other embodiments, the housing 199 may comprise a portion of the wind noise-filter 221, i.e. only a portion of the wind-noise filter 221 is enclosed or received inside the housing 221. In other embodiments (and as shown), the housing 199 does not comprise or receive the wind-noise filter 221, i.e. the wind-noise filter 221 is simply adjacent to the (cavity 109 of the) housing 199. Depending on a specific need and/or implementation, the wind noise filter 221 may have a different degree of area being adjacent to the housing 199. Furthermore, the shape of the wind noise filter 221 may also be different than shown. As illustrated and as preferred, the channel 222 of the wind noise filter 221 is fully through-going. However, in alternative embodiments, the channel 222 of the wind noise filter 221 is only partially or substantially through-going as disclosed herein.

It is to be understood that depending on a specific need and the embodiment(s) associated with the need, other constructional and/or operational variations may be envisaged, for example where the housing 199 of the waterproof microphone assembly 100 encloses the transducer 101 but where the cavity 109 and/or the wind noise filter 221 is/are enclosed in a housing of a device, such as a headset and/or a hearing protection device, comprising the waterproof microphone assembly 100. In some further embodiments, the housing 199 of the waterproof microphone assembly 100 may be omitted and the transducer 101 and the cavity 109 and e.g. at least a portion of the wind noise filter 221 may be enclosed or received in a housing of a device, such as a headset and/or a hearing protection device, comprising the waterproof microphone assembly 100.

Figure 3:
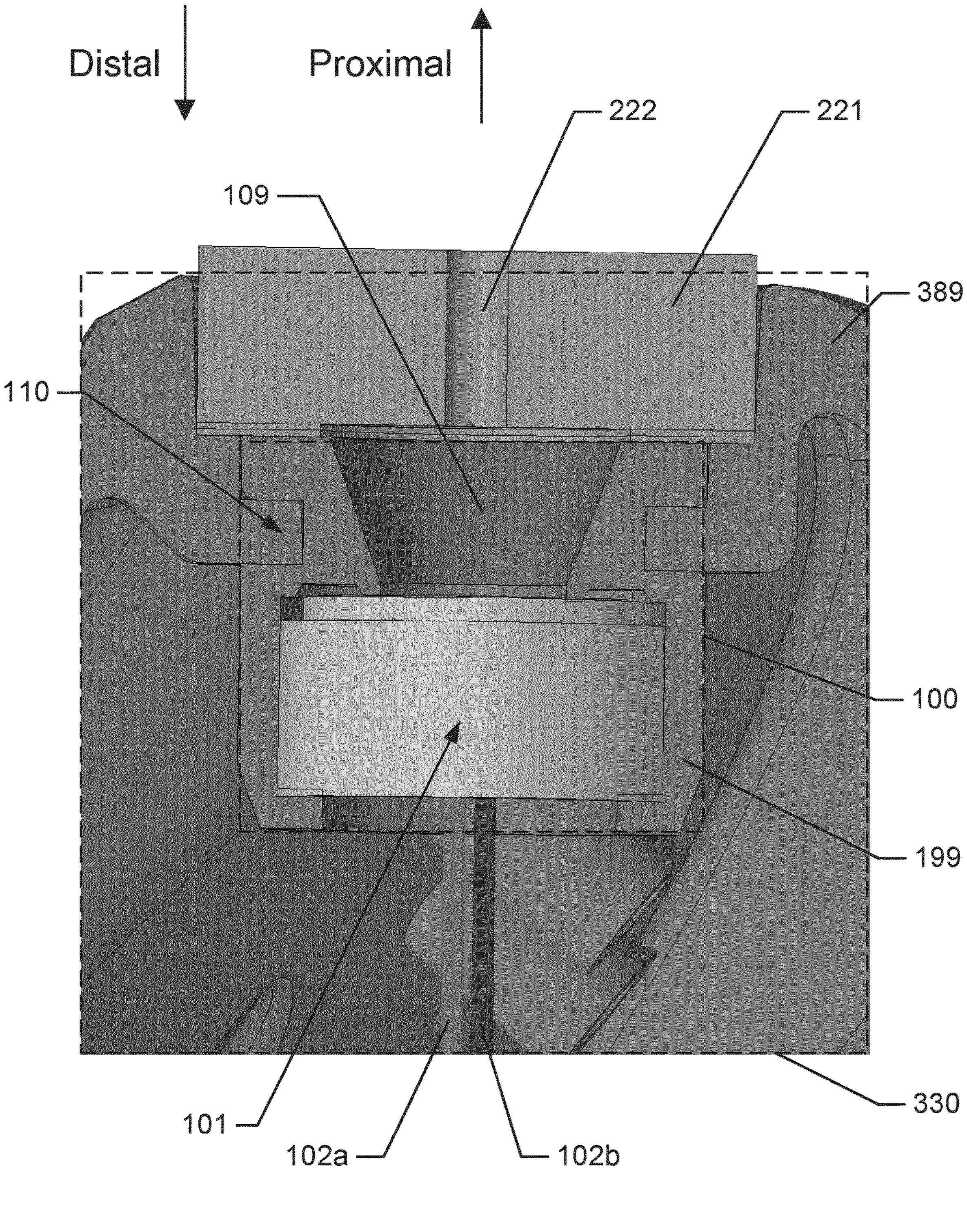
FIG. 3 schematically illustrates a cross-sectional view of a part of a headset and/or a hearing protection device comprising a waterproof microphone assembly with a wind-noise filter as disclosed herein.

FIG. 3 schematically illustrates a cross-sectional view of a part of a headset and/or a hearing protection device comprising a waterproof microphone assembly with a wind-noise filter as disclosed herein. Shown is a waterproof microphone assembly 100 as disclosed herein being an integral part of a housing 389, e.g. a shell of an ear cup or other, of a headset and/or a hearing protection device 330 (only shown in part). The housing 199 of the microphone assembly 100 may be configured to fit within the headset and/or a hearing protection device housing 389 of the headset and/or a hearing protection device 330. Many different embodiments may be envisioned based on a specific need, e.g. how the housing 199 is located within the headset and/or a hearing protection device housing 389. As a way of example, the headset and/or a hearing protection device housing 389 may have one or more portions (no denotation) configured to fit a recess or the like 110 of the housing 199.

Figure 4:
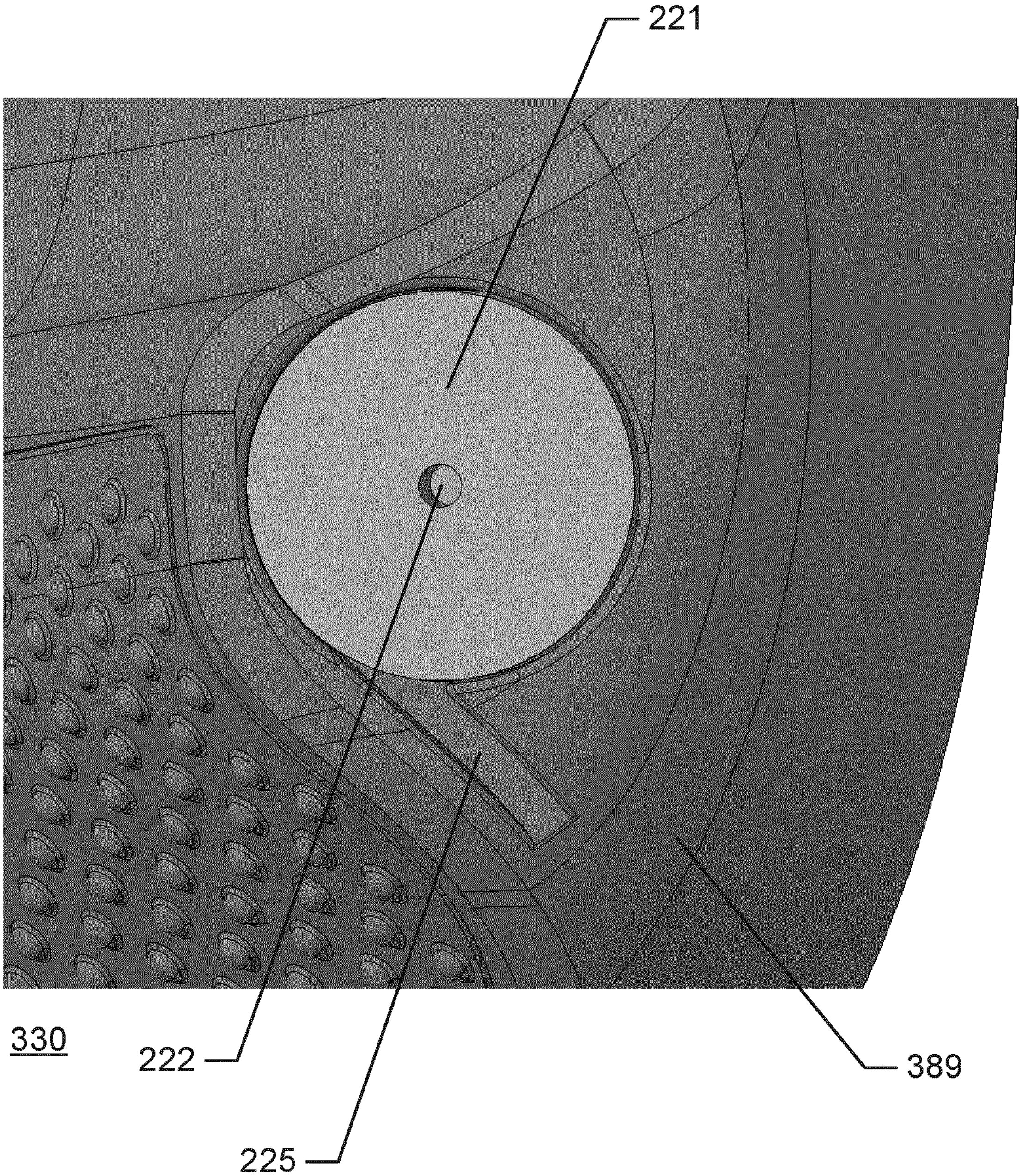
FIG. 4 schematically illustrates a side or external view of a part of a headset and/or a hearing protection device comprising a draining channel and a waterproof microphone assembly as disclosed herein.

FIG. 4 schematically illustrates a side or external view of a part of a headset and/or a hearing protection device comprising a draining channel and a waterproof microphone assembly as disclosed herein. Shown is a (part of a) housing 389 of a headset and/or a hearing protection device 330 (e.g. as the one shown in FIG. 3) comprising the waterproof microphone assembly. The headset and/or a hearing protection device 330 is shown substantially in the distal direction. Further shown is a wind-noise filter 221 with a through-going channel 222, both as disclosed herein.

Illustrated is also a draining slot, groove, duct, channel, or similar 225 (herein equally referred to only as draining channel) in the housing 389 of the headset and/or a hearing protection device 330 adjoining and/or being adjacent to the wind-noise filter 221. The draining channel 225 is open towards the wind-noise filter 221 and has a direction towards the ground so that water in the wind-noise filter 221 will drain out and into the draining channel 225 due to gravitational pull thereby gradually removing water from the wind-noise filter 221. Furthermore, droplets will typically form at an end of the draining channel 225 being furthest away from the wind-noise filter 221 allowing water to drip away. Passively emptying or at least drawing out water from the wind-noise filter 221 enables the wind-noise filter 221 to absorb more water from the through-going channel 222 and/or the cavity (see e.g. 109 in FIGS. 1-3).

In some embodiments, the opening or part of the draining channel being closest to the wind-noise filter is duct or funnel shaped.

In some embodiments (and as shown), the draining channel 225 has a general direction across, e.g. diagonally or downwards across, an up-down direction (of the Figure). In some alternative or additional embodiments, the draining channel 225 is configured to utilize a capillary effect, e.g. by being relatively narrow, to more efficiently receive water from the wind-noise filter 221.

For a given (usable) direction, the longer the draining channel 225 is, the better it drains water due to gravitational pull.

It is noted, that the draining channel 225 does not need to be straight but may e.g. be curved or partly curved.

The illustrated direction of the draining channel 225 (with down in the Figure being towards the ground upon which a user, wearing the headset and/or a hearing protection device 330, stands upright looking forward) is the direction, at least in some embodiments, of the draining channel 225 when the user is wearing the headset and/or a hearing protection device 330 normally or at least as intended.

It is noted, that the embodiments of FIGS. 1-3 may also comprise a draining channel (although not visible from the used illustration directions).

Figure 5:
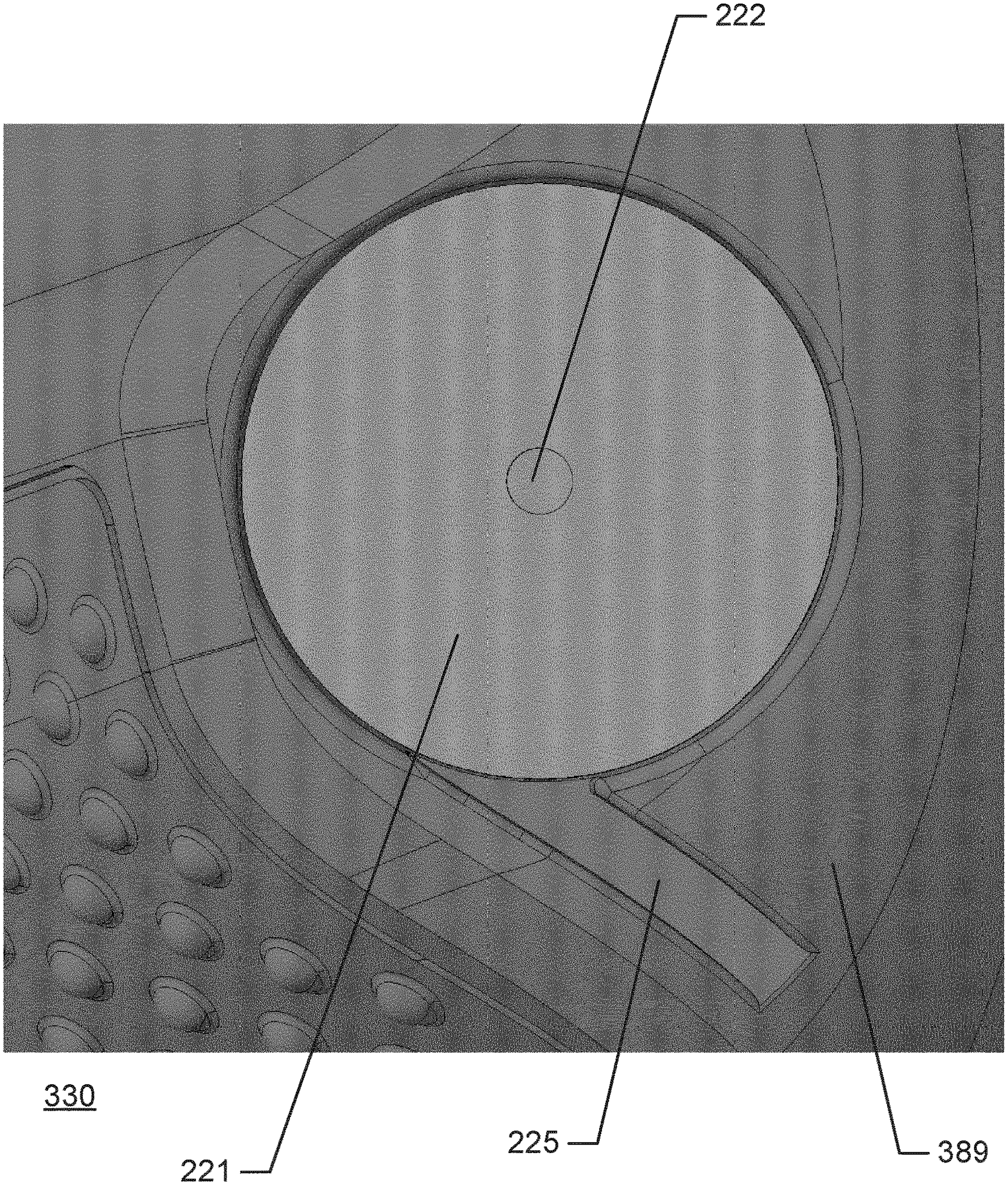
FIG. 5 schematically illustrates an enlarged view of a part of FIG. 4.

FIG. 5 schematically illustrates an enlarged view of a part of FIG. 4 (from a slightly different angle) more clearly illustrating details of the draining channel 225.

It will be apparent to a person skilled in the art that the various described embodiments of various embodiments according to the current aspect can be combined without departing from the scope of the disclosure as defined in the claims. In particular, it is to be understood that other examples may be utilised and structural and functional modifications may be made without departing from the scope of the present disclosure.

The invention claimed is:

1. A waterproof microphone assembly comprising:

a waterproof acoustic transducer configured to convert impinging sound energy into an electrical microphone signal;

a wind noise filter configured to suppress ambient noise and comprising a first side and a second side, wherein the wind noise filter comprises a through-going or partially through-going channel located between and connecting the first side and the second side; and a housing comprising a cavity having a distal end and a proximal end, wherein the distal end of the cavity is acoustically connected with the acoustic transducer and the proximal end of the cavity is adjacent to and/or comprises a part of the first side of the wind noise filter; and wherein the wind noise filter is configured to absorb a liquid from at least the through-going or partially through-going channel, the liquid being water, and wherein the wind noise filter is made from a material that includes a porous foam.

2. The waterproof microphone assembly according to claim 1, wherein the wind noise filter is configured to additionally or alternatively absorb water directly from the cavity.

3. The waterproof microphone assembly according to claim 2, wherein the wind noise filter is configured to expel at least a part of the water absorbed by the wind noise filter in response to an applied mechanical pressure or force.

4. The waterproof microphone assembly according to claim 2, wherein a draining channel is located adjoining and/or adjacent to the wind-noise filter and furthermore is located below or under the wind-noise filter towards the ground whereby water in the wind-noise filter will drain into the draining channel in response to a gravitational pull.

5. The waterproof microphone assembly according to claim 2, wherein the cavity has a cross-sectional conical or trumpet shaped form and wherein the distal end of the cavity has a smaller diameter than the proximal end of the cavity.

6. The waterproof microphone assembly according to claim 2, wherein the through-going or partially through-going channel is located centrally in the first side and/or the second side of the wind noise filter or is located aligned with a centre of the cavity and/or a centre of the acoustic transducer.

7. The waterproof microphone assembly according to claim 2, wherein the wind noise filter comprises an internal part entering into the cavity and comprises an external part extending outside the housing.

8. The waterproof microphone assembly according to claim 1, wherein the wind noise filter is made from a deformable material.

9. The waterproof microphone assembly according to claim 1, wherein the wind noise filter is configured to expel at least a part of the water absorbed by the wind noise filter in response to an applied mechanical pressure or force.

10. The waterproof microphone assembly according to claim 1, wherein a draining channel is located adjoining and/or adjacent to the wind-noise filter and furthermore is located below or under the wind-noise filter towards the ground whereby water in the wind-noise filter will drain into the draining channel in response to a gravitational pull.

11. The waterproof microphone assembly according to claim 1, wherein the cavity has a cross-sectional conical or trumpet shaped form and wherein the distal end of the cavity has a smaller diameter than the proximal end of the cavity.

12. The waterproof microphone assembly according to claim 1, wherein the through-going or partially through-going channel is located centrally in the first side and/or the second side of the wind noise filter.

13. The waterproof microphone assembly according to claim 1, wherein the through-going or partially through-going channel is located aligned with a centre of the cavity and/or a centre of the acoustic transducer.

14. The waterproof microphone assembly according to claim 1, wherein the wind noise filter comprises an internal part entering into the cavity and comprises an external part extending outside the housing.

15. The waterproof microphone assembly according to claim 1, wherein the wind noise filter is further configured to absorb another liquid other than water.

16. A headset and/or hearing protection device comprising a waterproof microphone assembly according to claim 1.

17. The headset and/or hearing protection device according to claim 16, wherein a housing of the headset and/or hearing protection device comprises a draining channel located adjoining and/or being adjacent to the wind-noise filter and located below the wind-noise filter whereby water in the wind-noise filter will drain into the draining channel in response to a gravitational pull.

18. A waterproof microphone assembly comprising:

a waterproof acoustic transducer configured to convert impinging sound energy into an electrical microphone signal;

a wind noise filter configured to suppress ambient noise and comprising a first side and a second side, wherein the wind noise filter comprises a through-going or partially through-going channel located between and connecting the first side and the second side; and a housing comprising a cavity having a distal end and a proximal end, wherein the distal end of the cavity is acoustically connected with the acoustic transducer and the proximal end of the cavity is adjacent to and/or comprises a part of the first side of the wind noise filter; and wherein the wind noise filter is configured to absorb water from at least the through-going or partially through-going channel, wherein the wind noise filter is composed of a porous foam.

* * * * *